(12) United States Patent
Schmidt

(10) Patent No.: US 6,557,329 B2
(45) Date of Patent: May 6, 2003

(54) BALL RELEASE SNAP HITCH FOR HORSE CROSS TIES

(76) Inventor: Allen Schmidt, 11975 Watkins Rd., Manchester, MI (US) 48158

(*) Notice: Subject to any disclaimer, the term of this patent is extended or adjusted under 35 U.S.C. 154(b) by 0 days.

(21) Appl. No.: 09/790,748

(22) Filed: Feb. 22, 2001

(65) Prior Publication Data

US 2001/0045085 A1 Nov. 29, 2001

Related U.S. Application Data

(60) Provisional application No. 60/184,337, filed on Feb. 23, 2000.

(51) Int. Cl.[7] .................................................. B68B 1/02
(52) U.S. Cl. ........................................ 54/85; 24/265 H
(58) Field of Search ............................... 54/85, 34, 64, 54/56; 119/769; 24/265 H, 602, 115 F; 403/1

(56) References Cited

U.S. PATENT DOCUMENTS

| | | | |
|---|---|---|---|
| 272,715 A | * 2/1883 | Letchworth | 54/85 |
| 3,944,023 A | * 3/1976 | Fisher | 182/48 |
| 4,330,926 A | * 5/1982 | McCall | 29/525.01 |
| 4,858,977 A | * 8/1989 | Mitchell | 294/82.1 |
| 5,187,844 A | * 2/1993 | Simond | 24/599.5 |
| 5,368,084 A | * 11/1994 | Hying et al. | 160/265 |
| 5,502,878 A | * 4/1996 | Anscher | 24/265 H |
| 5,548,875 A | * 8/1996 | Hart et al. | 24/265 H |
| 5,575,443 A | * 11/1996 | Honeycutt | 248/231.9 |
| 5,634,246 A | * 6/1997 | Jermyn, Jr. | 24/265 H |
| 6,070,308 A | * 6/2000 | Rohlf | 24/600.8 |
| 6,286,190 B1 | * 9/2001 | Friend et al. | 24/265 |

* cited by examiner

*Primary Examiner*—Peter M. Poon
*Assistant Examiner*—Joan M. Olszewski
(74) *Attorney, Agent, or Firm*—James M. Deimen

(57) ABSTRACT

A modified snap hitch for connecting the cross tie ropes or trailer tie ropes to the halter on a horse comprises a quick release mechanism connecting the ring to the hook of a snap hitch. The quick release mechanism can take a variety of forms, such as a shear pin or other easily replaceable part. However, in the preferred embodiment, a plurality of ball detent mechanisms are used, and the ring and hook can be reconnected as soon as the horse is calmed.

7 Claims, 2 Drawing Sheets

BALL RELEASE SNAP HITCH FOR HORSE CROSS TIES

This application claims the benefit of provisional patent application No. 60/184,337, filed Feb. 23, 2000.

BACKGROUND OF THE INVENTION

The field of the invention pertains to devices to restrain a horse or similar large domesticated animal during minor medical or other treatment.

When a horse is in need of minor medical attention, such as shots for vaccines, antibacterial agents or antiviral agents, or in need of attention to its hoofs, fur or skin, the horse is restrained by cross-ties or trailer ties in a barn aisle way. The ties are ropes attached to barn posts at one end and the halter at the other end, thereby restraining the horse.

On occasion, usually as a result of treatment, the horse will suddenly pull back or panic with obvious danger to the horse, the handler or anyone else, such as a veterinarian, nearby. The horse may break the tie ropes or halter. To increase safety for the horse and personnel nearby, the following improved device has been developed.

SUMMARY OF THE INVENTION

The invention comprises a modified snap hitch for connecting the cross-tie ropes or trailer tie ropes to the halter on a horse. Snap hitches commonly have a hook and spring urged tongue at one end and a ring at the other end which may or may not have a swivel connection to the hook. The modification comprises a quick release mechanism connecting the ring to the hook of a snap hitch.

Such a quick release mechanism can take a variety of forms, such as a shear pin or other easily replaceable part. However, in the preferred embodiment more fully described below, a ball detent mechanism is used. With a ball detent mechanism, the ring and hook can be reconnected as soon as the horse is calmed. The modification is applicable to both a swivel ring or a non-swivel ring on the snap hitch. The modification also is applicable to other configurations for connecting the cross-tie ropes. For example, a second ring could be substituted for the snap hook or cable/rope clamps substituted for the ring or snap hook or both. A snap hook and ring combination are shown in the preferred embodiment because the test prototype has this configuration.

DESCRIPTION OF THE PREFERRED EMBODIMENTS

Figure 1:
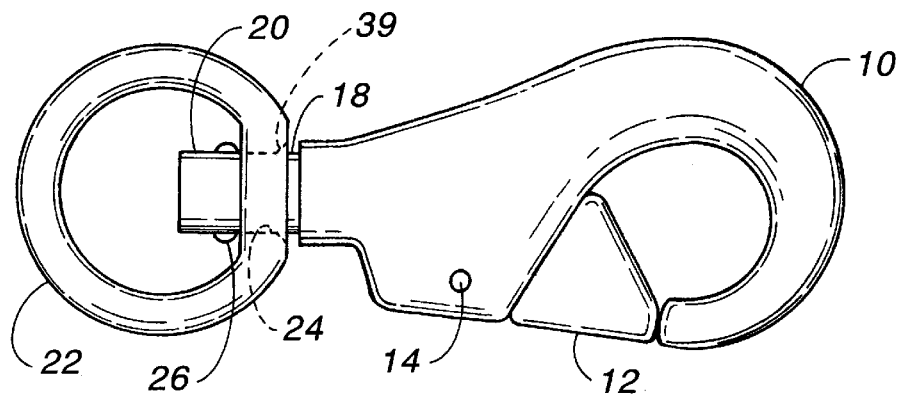
FIG. 1 is a side view of the improved snap hitch.
Figure 2:
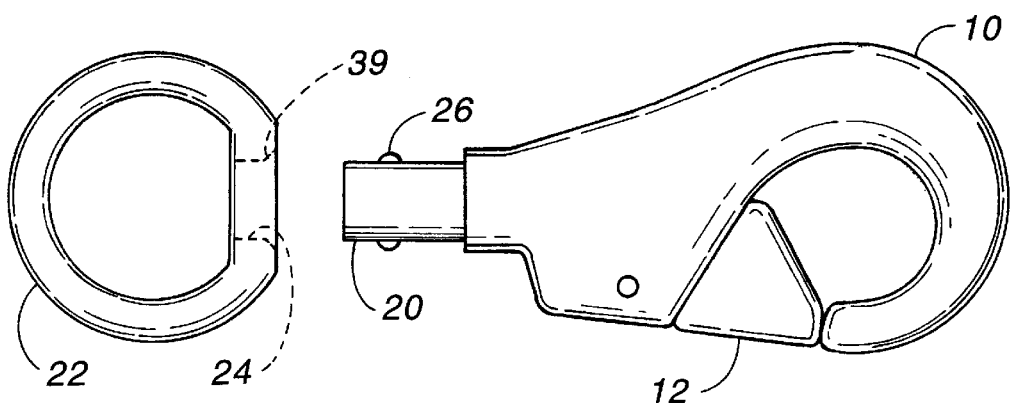
FIG. 2 is a side view of the disassembled snap hitch.
Figure 3:
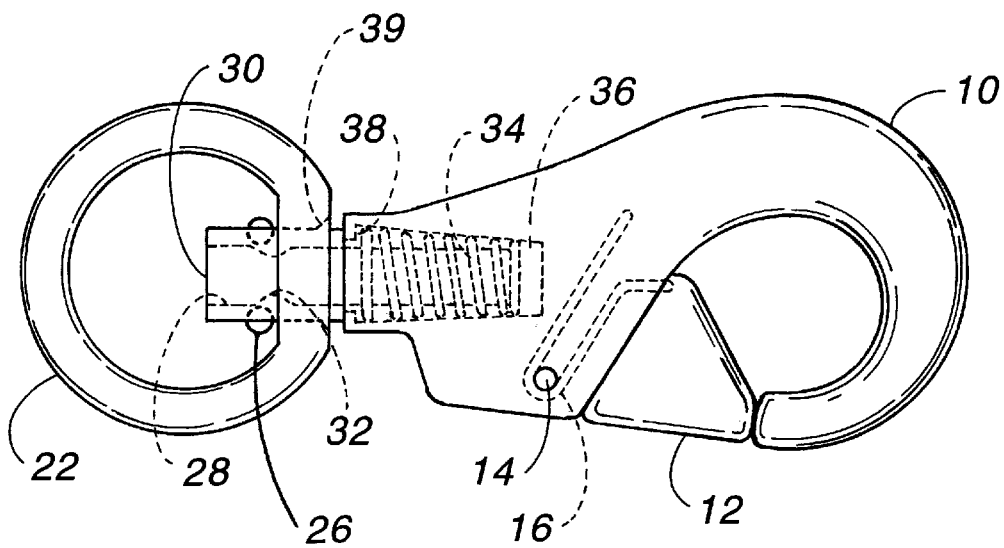
FIG. 3 is a side view of the snap hitch internal mechanism.
Figure 4:
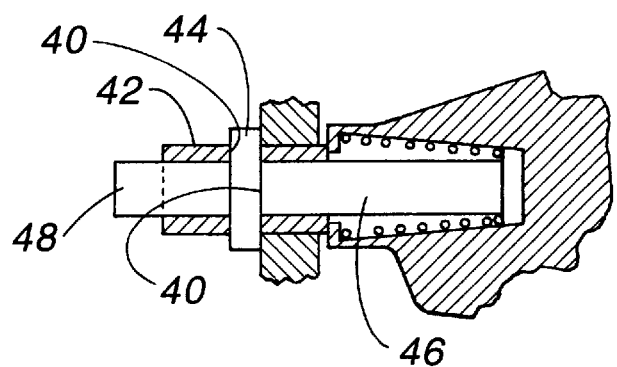
FIG. 4 is a side view of an alternative shear pin snap hitch internal mechanism.

Illustrated in FIG. 1 is a snap hitch comprising hook 10 having a tongue 12 rotatable about a pin 14. As best shown in FIG. 3, the tongue 12 is urged closed by an internal spring 16.

Integrally extending from the base 18 of the hook 10 is a stud 20. A ring 22 is releaseably mounted on the stud 20 by means of a hole 24 through the side wall of the ring. The stud 20 and through hole 24 may be both cylindrical thereby allowing the ring 22 to swivel relative to the hook 10. As an alternative, the stud 20 and hole 24 may be non-cylindrical thereby preventing swivelling of the ring 22 relative to the hook 10.

Mounted on the stud 20 in small sockets are one or more ball detents 26. The amount of force applied axially to the hook 10 and ring 22 to depress the ball detents 26 determines the breaking force necessary to release the snap hitch. This force should be about 50 to 150 pounds, but may be outside this range if so desired.

Referring to FIG. 3, the stud 20 includes a bore hole 28 within which is a detent pin 30. The detent pin 30 is formed with detent pockets 32 for each ball detent 26. The detent pockets 32 are sloped whereby inward force on the ball detents 26 drives the detent pin 30 axially in opposition to a detent spring 34. To provide the opposition force and urge the ball detents 26 outwardly, the conical detent spring 34 is compressed between a head 36 on the detent pin 30 and a shoulder 38 counterbored into the borehole 28 of the stud 20. To reduce the force required to reassemble the ring 22 to the snap hook 10 a chamfer 39 may be formed about the hole 24.

If a shear pin is preferred, the detent pockets 32 are replaced by a through hole 40 extending through opposite sides of the detent pin 46 and stud 42, and the ball detents 26 are replaced by a shear pin 44 extending beyond the stud 42 on opposite sides and extending through the detent pin 46. Thus, the shear pin 44 is held in position by the detent pin 46 and easily released and replaced by pulling out on the end 48 of the detent pin.

The ball detent 26 or shear pin 44 versions of the snap hitch must be capable of resisting the normal motions of a large horse, therefore 50–150 pounds of force will be required to release the ball detents 26 or sever the shear pin 42. However, depending on the positioning of the cross-ties or trailer ties, more or less resistance to release may be required.

In addition to lessening the danger to the horse and handler, there is also no cost to reassembling the ball detent version and little cost to replacing a shear pin.

I claim:

1. A horse cross-tie hitch comprising means to attach to a halter at one end and a detachable ring at the other end, a hole extending through the sidewall of the ring, a stud extending from the means to attach to a halter and sized to fit through the hole in the sidewall of the ring, means extending from the stud and adapted to provide limited resistance to detachment of the ring from the stud when the stud is fitted through the hole in the ring sidewall, said means extending from the stud comprising at least one ball detent, means to provide lesser resistance to reattachment of the stud through the hole in the ring sidewall than the limited resistance to detachment, said means to provide lesser resistance to reattachment comprising a chamfer formed around the hole, and momentarily engageable with the at least one ball detent during reattachment.

2. A horse cross-tie snap hitch comprising an elongate hook at one end and a ring at the other end, a hole extending through the sidewall of the ring, a stud extending from the hook and sized to fit through the hole in the sidewall of the ring, a plurality of means extending from the stud and adapted to provide limited resistance to detachment of the ring from the stud when the stud is fitted through the hole in the ring sidewall, said plurality of means extending from the stud comprising a plurality of ball detents, and means to provide lesser resistance to reattachment of the stud through the hole in the ring sidewall than the limited resistance to detachment, said means to provide the lesser resistance to reattachment comprising a chamfer formed around the hole and momentarily engageable with the ball detents during reattachment.

3. The horse cross-tie snap hitch of claim 2 including a borehole in the stud, a pin in the borehole formed with pockets engaging the plurality of ball detents, and a spring engaging the pin whereby the spring and pin urge the ball detents outwardly from the stud.

4. A horse cross-tie snap hitch comprising an elongate hook at one end and a ring at the other end, a hole extending through the sidewall of the ring, a stud extending from the hook and sized to fit through the hole in the sidewall of the ring, a borehole in the stud, a detent pin in the borehole and a spring retaining the detent pin in the borehole, means extending from the stud and adapted to provide limited resistance to detachment of the ring from the stud when the stud is fitted through the hole in the ring sidewall, the means extending from the stud including a transverse hole through the stud and detent pin, and a shear pin in the transverse hole, each end of the shear pin extending beyond the stud on opposite sides of the stud.

5. In the combination of a plurality of cross-ties attached to snap hitches, the snap hitches being attachable to a horse halter and comprising hooks attached to rings, a hole through the sidewall of each ring, a stud extending from the hook and through the hole of each ring, a plurality of means extending from each stud and adapted to provide limited resistance to detachment of each ring from each stud, said plurality of means extending from each stud comprising a plurality of ball detents, and the improvement comprising means to provide lesser resistance to reattachment of the studs through the holes in the ring sidewalls than the limited resistance to detachment, said means to provide the lesser resistance to reattachment comprising a chamfer formed around each hole and momentarily engageable with the corresponding ball detents during reattachment.

6. The combination of claim 5 including a borehole in each stud, a pin in each borehole formed with pockets engaging the plurality of ball detents, and a spring engaging each pin whereby the springs and pins urge the ball detents outwardly from the studs.

7. In the combination of a plurality of cross-ties attached to snap hitches, the snap hitches being attachable to a horse halter and comprising hooks attached to rings, a hole through the sidewall of each ring, a stud extending from each hook and through the corresponding hole of each ring, a borehole in each stud, a detent pin in each borehole and a spring retaining each detent pin in each borehole, means extending from each stud and adapted to provide limited resistance to detachment of the corresponding ring from the stud, the means including a transverse hole through each stud and detent pin, and a shear pin in each transverse hole, each end of each shear pin extending beyond each stud on opposite sides of the stud.

* * * * *